(12) United States Patent
Prohofsky (10) Patent No.: US 11,132,324 B2
(45) Date of Patent: Sep. 28, 2021

(54) DATA NETWORK WITH CONTAINER VIRTUALIZATION

(71) Applicant: Seagate Technology LLC, Cupertino, CA (US)

(72) Inventor: Thomas R. Prohofsky, Edina, MN (US)

(73) Assignee: Seagate Technology, LLC, Cupertino, CA (US)

(*) Notice: Subject to any disclaimer, the term of this patent is extended or adjusted under 35 U.S.C. 154(b) by 250 days.

(21) Appl. No.: 16/010,909

(22) Filed: Jun. 18, 2018

(65) Prior Publication Data

US 2019/0384738 A1 Dec. 19, 2019

(51) Int. Cl.
*G06F 3/06* (2006.01)
*G06F 13/42* (2006.01)
*G06F 9/455* (2018.01)

(52) U.S. Cl.
CPC ........ *G06F 13/4221* (2013.01); *G06F 3/061* (2013.01); *G06F 3/0655* (2013.01); *G06F 3/0683* (2013.01); *G06F 9/45558* (2013.01); *G06F 2009/45583* (2013.01); *G06F 2213/0026* (2013.01)

(58) Field of Classification Search
CPC ...... G06F 3/0605; G06F 3/061; G06F 3/0655; G06F 3/0665; G06F 3/067; G06F 3/0683; G06F 9/45558; G06F 13/4221; G06F 2009/45583; G06F 2213/0026

See application file for complete search history.

(56) References Cited

U.S. PATENT DOCUMENTS

| | | | |
|---|---|---|---|
| 8,594,835 B2 | 11/2013 | Lert et al. | |
| 9,158,567 B2 | 10/2015 | Chawla et al. | |
| 9,256,467 B1 | 2/2016 | Singh et al. | |
| 9,292,219 B2 | 3/2016 | Oiwa | |
| 9,569,180 B1 | 2/2017 | Jiang et al. | |
| 2010/0031258 A1 | 2/2010 | Takano et al. | |
| 2013/0055284 A1* | 2/2013 | Sabato | G06F 9/526 718/106 |
| 2016/0034809 A1 | 2/2016 | Trenholm et al. | |
| 2016/0043968 A1 | 2/2016 | Jacob et al. | |
| 2016/0352831 A1* | 12/2016 | Totolos | G06F 21/44 |
| 2017/0060613 A1 | 3/2017 | Warkentin et al. | |
| 2017/0206034 A1* | 7/2017 | Fetik | H04L 67/1097 |
| 2017/0372173 A1 | 12/2017 | Kairali et al. | |
| 2017/0374147 A1* | 12/2017 | McNair | H04L 41/0896 |
| 2018/0060256 A1* | 3/2018 | Walker | G06F 13/1642 |

OTHER PUBLICATIONS

NVM Express REvision 1.2, Nov. 2014 (Year: 2014).*

* cited by examiner

*Primary Examiner* — Larry T Mackall
(74) *Attorney, Agent, or Firm* — Hall Estill Law Firm (57) ABSTRACT

A first data storage device and a second data storage device can be connected to a first remote host and a second remote host via a server as part of a distributed data network. The server may assign the first data storage device to administer a first virtualization for a first logical volume of the first remote host. A device controller of the data storage device can execute an operating system and then load at least one operating component in the first remote host as directed by the first device controller. The device controller can subsequently perform a first software application in the first remote host as part of the first virtualization.

19 Claims, 5 Drawing Sheets

DATA NETWORK WITH CONTAINER VIRTUALIZATION

SUMMARY OF THE INVENTION

A data network, in accordance with some embodiments, has first and second data storage devices respectively connected to first and second remote hosts via a server. The server assigns the first data storage device to administer a first virtualization for a first logical volume of the first remote host. A device controller of the data storage device executes an operating system and then load at least one operating component in the first remote host as directed by the first device controller and performs a first software application in the first remote host as part of the first virtualization.

Various embodiments arrange a data network with first and second remote hosts each connected to first and second data storage devices via a server. The server is configured to assign the first data storage device to administer a first virtualization for the first remote host.

In other embodiments, first and second data storage devices respectively connected to first and second remote hosts via a server. The server assigns the first data storage device to administer a first virtualization for a first logical volume of the first remote host. A device controller of the data storage device executes an operating system and then load at least one operating component in the first remote host as directed by the first device controller and performs a first software application in the first remote host as part of the first virtualization. An in-drive mutex is activated in the first data storage device as directed by the first device controller to synchronize operation of the first data storage device.

DETAILED DESCRIPTION

The present disclosure is generally directed to a data network configured to optimize virtualization performance, particularly with virtualized containers.

The proliferation of network computing, such as cloud data storage, have allowed computing devices to provide increasingly robust computing capabilities without growing in physical size. Over time, devices like laptop computers, tablet computers, and smartphones have utilized network computing capabilities with virtualization to achieve greater data storage, data access, and software execution than would be available with the hardware in a single respective device. While network computing and virtualization have increased the potential of computing devices, practical issues exist in fulfilling such potential with the implementation of virtualization on numerous different computing devices across a distributed data network.

Accordingly, various embodiments are directed to a data network that matches computing device hosts to remote data storage devices to carry out data storage and virtualization. The ability to have a remote data storage device, instead of a centralized network server, conduct virtualization operations allows for heightened computing performance by removing signal and command bottlenecks. The use of network data storage devices for virtualization further allows for the implementation of sophisticated network policies that can be efficiently customized to optimize data storage and execution despite large numbers of different computing devices concurrently accessing the data network.

Figure 1:
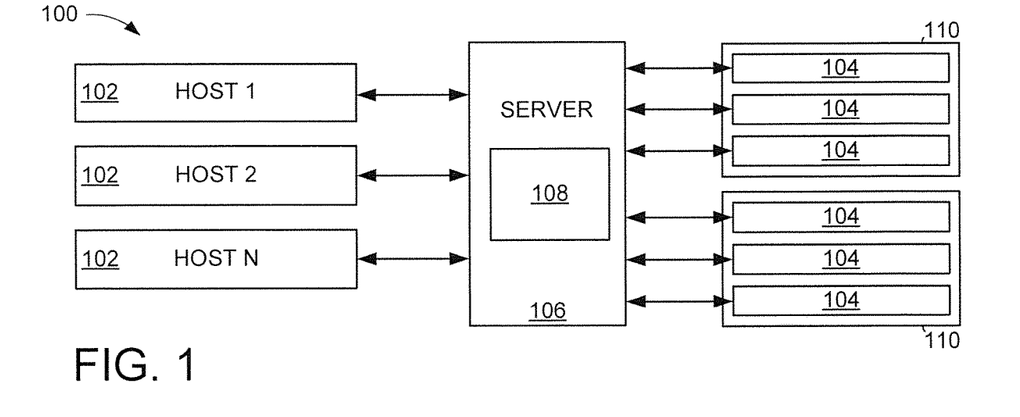
FIG. 1 is a block representation of a portion of an example distributed data network arranged in accordance with various embodiments.

An example distributed data network 100 is shown as a block representation in FIG. 1. In accordance with some embodiments, the data network 100 can have any number (N) of remote hosts 102, such as computing devices, network nodes, or other source of data access requests and commands. A number (X) of data storage devices 104 can be aggregated to provide a greater data capacity than any single device 104.

A network server 106 can be logically, and physically, disposed between the remote hosts 102 and the respective data storage devices 104 to provide data storage management for the system 100. The network server 106 can be a variety of different computing components, such as a computer, switch, router, or node, that employ one or more server controllers 108 to process data access requests to the data storage devices 104 as well as execute firmware, software, and applications to facilitate virtualization in one or more remote hosts 102.

As shown, a plurality of data storage devices 104 can be aggregated into an enclosure 110. An enclosure 110 can be a physical component that actually houses the respective data storage devices 104 or a logical component where the data storage devices 104 are physically separated, but are collectively accessed by the server controller 108. It is contemplated that multiple physical enclosures 110 can be concurrently housed within a common storage rack to provide the data network 100 with large data storage capacity with a relatively small physical footprint.

The position of the server 106 allows data access requests and software commands from multiple different hosts 102 to be processed and serviced in a manner determined by the server controller 108. As such, the server 106 allows the system 100 to be distributed over diverse physical locations to provide computing capabilities, such as data storage, to the remote hosts 102 without burdening the remote hosts 102 with the physical size of the server 106 or data storage device 104.

While a host 102 may directly access a data storage device 104 without connection to the server 106, as shown by segmented line 112, such connection is limited in bandwidth and data capacity while jeopardizing the operational integrity of the data storage device 104 due to conflicting host requests and formats from the connected network controller 106. Thus, various embodiments arrange a distributed data network 100 with each remote host 102 connected to the respective data storage devices 104 only via network-level components like the server 106.

Figure 2:
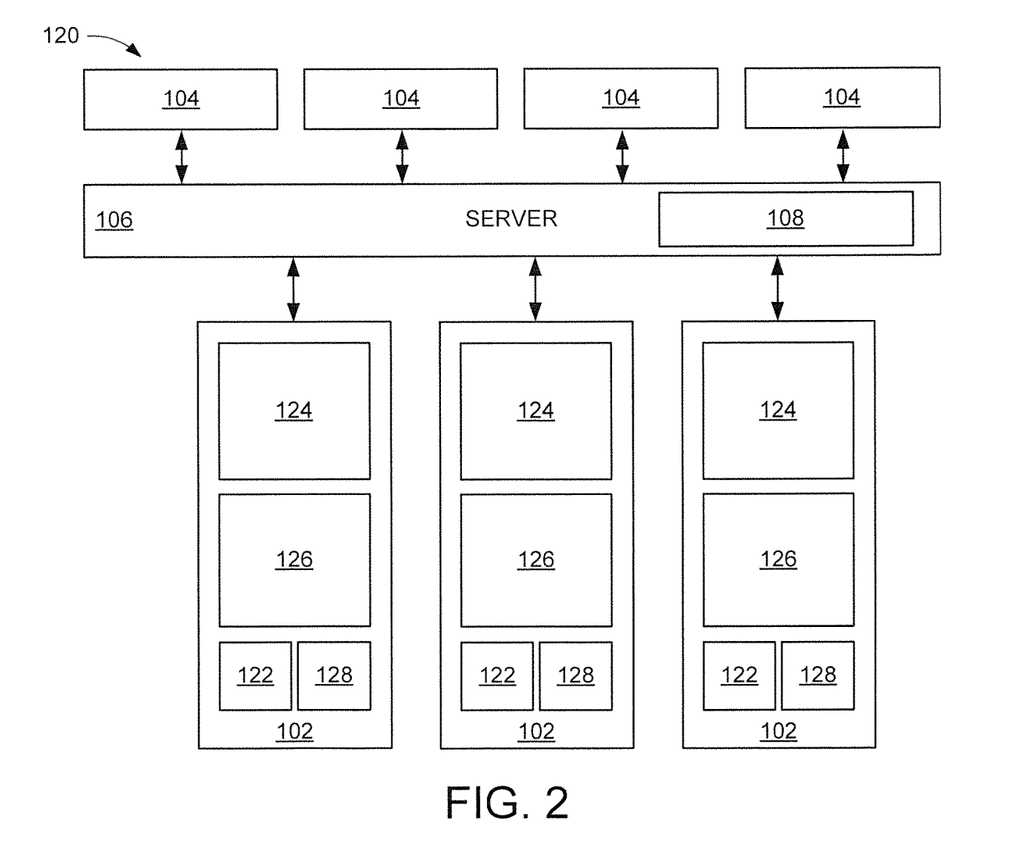
FIG. 2 displays a block representation of portions of an example data network configured in accordance with some embodiments.

As the computing capabilities of the server controller 108 and data storage devices 104 have advanced, the server 106 has been utilized for more than simple data reading and writing to the respective data storage devices 104. FIG. 2 illustrates a block representation of portions of an example distributed data network 120 where the server 106 can provide virtualization to one or more remote hosts 102 in accordance with various embodiments. The network 120 has a plurality of remote hosts 102 that can be physically located at separate locations, such as different cities, countries, and hemispheres.

The various hosts 102 are connected to a plurality of data storage devices 104 one or more servers 106. The server 106 can choreograph, schedule, and execute any number of data accesses, policy operations, and virtualization operations. Data accesses may be data reads and data writes to the respective data storage devices 104. Policy operations may be system maintenance activities, such as provisioning, security, garbage collection, and wear mitigation. Virtualization operations may be firmware, software, and/or software execution to mimic portions of the network 120 to one or more hosts 102.

In some embodiments, the server controller 110 is circuitry that conducts virtualization operations by loading an operating system (OS) 122 in a remote host 102, which may occur by executing a software bridge, such as a hypervisor. The OS 122 is received by the local host processor 124 and local storage 126 to be executed as directed by the host 102. The server controller 108 may additionally load operating components 128, such as files, drivers, and/or libraries, to the host 102 to allow use of the OS 122.

By loading the OS 122 and operating components 128 in the host 102, a virtual machine can be created that mimics the hardware of the server 106 to operate independently of the server 106, but relies on the server 106 for data access operations to, and from, the data storage devices 104 of the network 120. That is, files, software, firmware, and other data stored in the remote data storage devices 104 can remain while being utilized by the various host(s) 102 operating as a virtual machine. Such prevention of data being stored in the remote hosts 102 can increase data security, allow custom data access protocol via the server controller 108, and allow the local storage 126 to be relatively small, and fast, such as volatile memory or solid-state non-volatile memory.

While the virtualization shown in FIG. 2 can be used to generate multiple different virtual machines on different hosts 102, the administration of the virtualization can stress the computing capabilities of the server 106 and server controller 108. For instance, the bandwidth of the server 106 can be occupied with policy operations and/or virtualization software in a manner that degrades data access performance to/from the assorted data storage devices 104. The local loading of the OS 122 can also slow the availability of the remote host 102 and add complexity to the network 120, particularly when numerous different virtual machines are being serviced by the server 106 concurrently.

Figure 3:
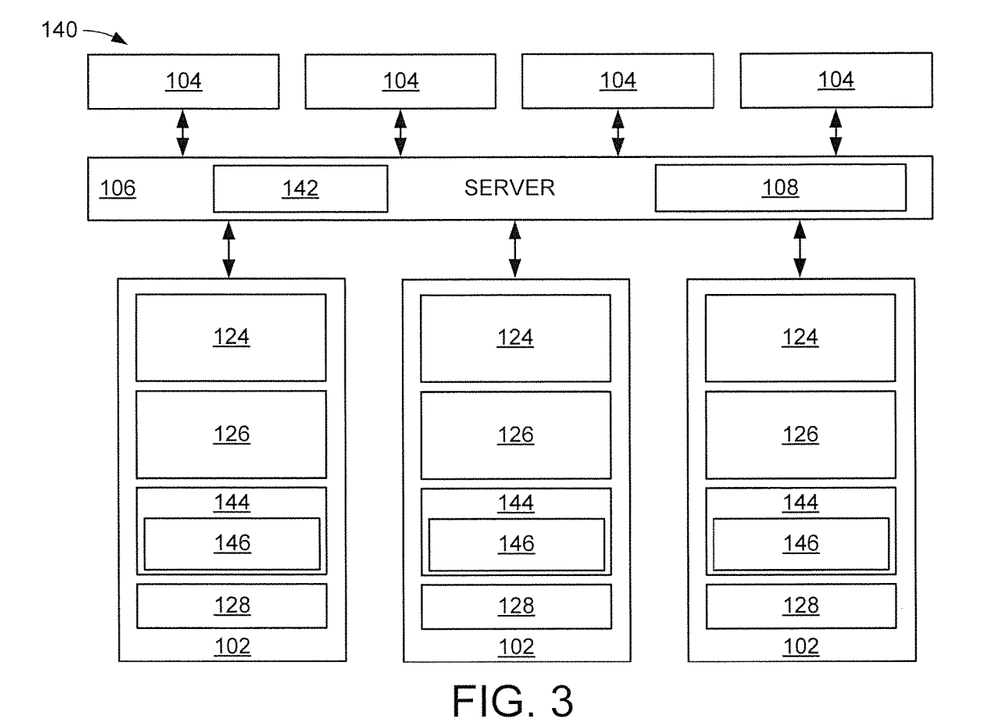
FIG. 3 shows a block representation of portions of an example data network that may be employed in the systems of FIGS. 1 & 2.

It is noted that by utilizing the server 106 for the various policy and virtualization operations, the data storage devices 104 are treated as "dummy" units that only carry out the instructions designated by a server controller 108. Treating the data storage devices 104 as dummy units may also be present in other types of virtualization. FIG. 3 represents portions of an example distributed data network 140 configured in accordance with various embodiments to execute container-based virtualization. As shown, the server controller 108 executes a single server operating system 142 that is individually accessed by the remote hosts 102 to execute software on the respective hosts 102.

The server controller 108 can load a container 144 by sending operating components 128 and a software application 146 to the host 102. In this way, the server controller 108 is mimicking the hardware and software of the server 106 on a host 102 to provide a lightweight package that allows relatively quick initialization and alteration due to the lack of an operating system being loaded and executed by the host 102. However, the shared operating system 142 can pose a security threat to sensitive data stored on any portion of the network 140 as well as for control of the server controller 108.

It is contemplated that the ease and quickness of deploying container-based virtualization allows for numerous containers to be concurrently employing the server controller 108 for operating system needs. As a non-limiting example, multiple containers can be deployed in different logical volumes of a host 102, which can result in degraded server controller 108 performance as more separate operating system 142 connections draw upon the server 106 than there are data storage devices 104 connected to the server 106.

Figure 4:
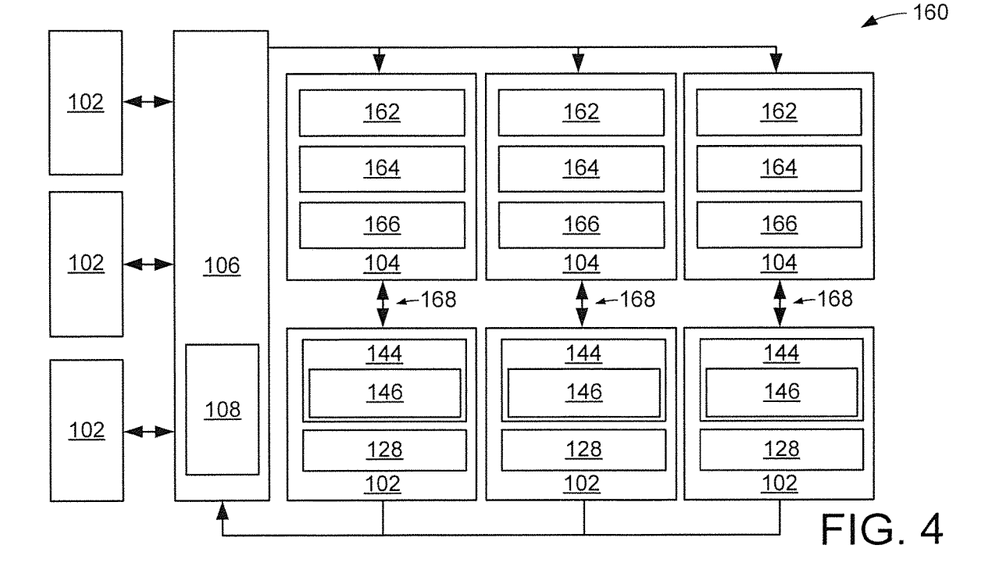
FIG. 4 illustrates portions of an example distributed data network arranged and operated in accordance with various embodiments.

Accordingly, various embodiments are directed to pairing a data storage device 104 to a remote host 102 to optimize virtualization, such as container-based virtualization. FIG. 4 depicts a block representation of portions of an example distributed data network 160 arranged and operated in accordance with some embodiments. As shown, the server 106 can direct a data storage device 104 logically between a remote host 102 and the server 106. The data storage device 104 utilizes a local device controller 162 and data storage means 164 to execute an operating system 166 that is employed by one or more remote hosts 102 to deploy container-based virtualization.

The use of a data storage device 104, instead of the server controller 108, allows the server controller 108 to direct high-level system operations, such as provisioning new, or removed, data storage devices 104. Although the device controller 162 has the ability to deploy container-based virtualization on multiple different hosts concurrently, the presence of multiple different data storage devices 104 allows the server 106 to selectively connect additional device controllers 162 to optimize individual host 102 performance as well as overall system performance. In other words, the server controller 108 can configure the data storage device-to-container connections 168 so that host performance, such as application execution latency, data access latency, and container initialization, is maximized. It is noted that the various hosts 102 may also communicate directly with the server 106 for non-virtualization operations, such as policy activity and data access requests not involved in the container 144, application 146, or operating components 128 of the virtualization.

The use of the device controller 162 can hasten container deployment and software application execution for the host 102 compared to the server controller 108 operating system deployment, as shown in FIG. 3, by reducing the computing load on the controller deploying the container-based virtualization. That is, the server controller 108 can control the number of remote hosts 102 and container connections 168 for each device controller 162 to provide an optimized balance of application execution in the host 102 with system complexity for the network 160. The performance of the device controller 162 compared to the server controller 108 may be heightened by the use of sophisticated data storage device 104 components, such as a peripheral component interconnect express (PCIe) bus employing a non-volatile memory express (NVMe) protocol.

It is contemplated that the server controller 108 selects to deploy different types of virtualization concurrently. For instance, the server controller 108 can direct one data storage device 104 to deploy container-based operating components 128 in a single host 102, another data storage device 104 to deploy container-based operating components to multiple different hosts 102, and another data storage device 104 to load an operating system in a host 102 as part of a virtual machine. Hence, the network 160 can selectively activate different types of virtualization that are carried out by separate device controllers 162 instead of one or more centralized server controllers 108.

While the decentralization of connections 168 from the server controller 108 to various device controllers 162 can increase container-based virtualization performance, such configuration adds complexity for the data storage devices 104 acting as repositories for system data while concurrently executing a virtualized operating system 164. To mitigate such complexity, a device controller 162 can employ an in-drive mutex to resolve conflicting data storage, policy, and host commands.

Figure 5:
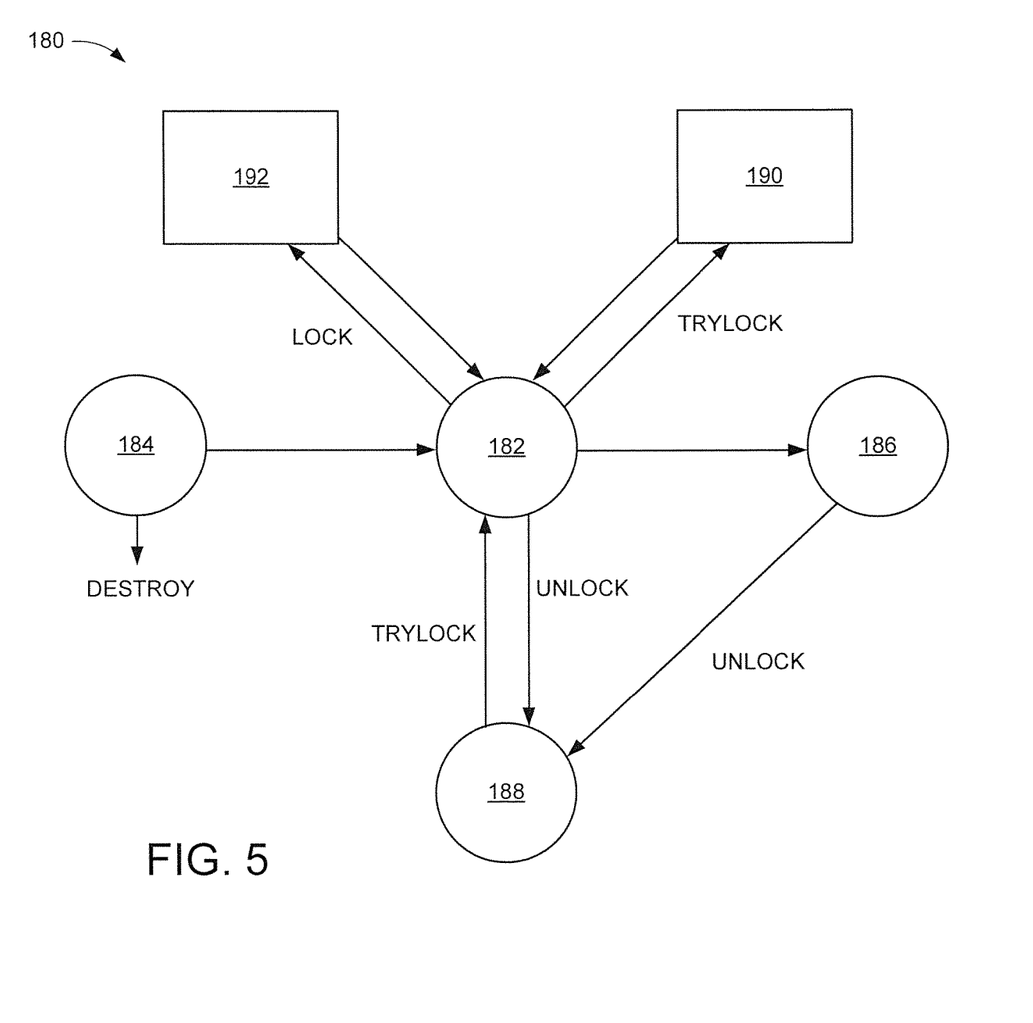
FIG. 5 depicts an example in-drive mutex that may be carried out with the distributed data storage systems of FIGS. 1-4.

FIG. 5 displays an example in-drive mutex 180 that can be conducted by a data storage device controller as part of a distributed data storage system in accordance with various embodiments. The in-drive mutex 1800 allows loosely coupled network servers, and their corresponding network controllers, to be synchronized in a shared block level storage configuration. The mutex 180 receives a data access request and instead of simply queuing the request, the mutex 180 attempts to lock 182 the request by comparing the request to other requests pending in any of the data storage devices of a distributed data storage system.

In a locked state 182, a request can be scheduled for execution by a local device controller. A request may initially be in an unclaimed state 184 where the request has no designated destination, which may be indicative of a redundant request from the remote hosts of the system. While attempts to claim the unclaimed request can result in the request being locked 182, a device controller can selectively destroy the requests after a predetermined number of lock tries and/or a predetermined amount of time passing.

A request in a locked state 182 can also undergo a countdown 186 of a number of request servicing attempts and/or a predetermined countdown time. If a request survives the countdown 186, the request may be classified in an unlocked state 188 where the request is not queued for servicing, but instead buffered and being compared to other requests. Once a request is deemed to be unique and not in conflict with other requests, the request can be classified in the locked state 182. It is noted that a locked request may be unlocked upon discovery of a request redundancy, conflict, or error without going through the countdown 186.

It is contemplated that a request is claimed, meaning it has a designated destination, without being locked 182. In such circumstances, a request may be characterized as busy 190 and a device controller can continuously, or sporadically, attempt to lock the request by resolving any request discrepancies with other pending data access requests. A device controller may also recognize altered aspects of a data storage system with the add state 192 where a locked request is verified after a change in host, data storage device, and/or logical volume configuration.

As a result of the in-drive mutex 180 a device controller can organize multiple data access requests from different remote hosts and synchronize request servicing among different logical volumes, and data storage devices, so that data access performance for the system is optimized. The mutex 180 creates a barrier for system resource contention between network components and logical data volumes while allowing a device controller to modify access control for a request on-the-fly and after the request has been issued by a host and received by a data storage device.

Figure 6A:
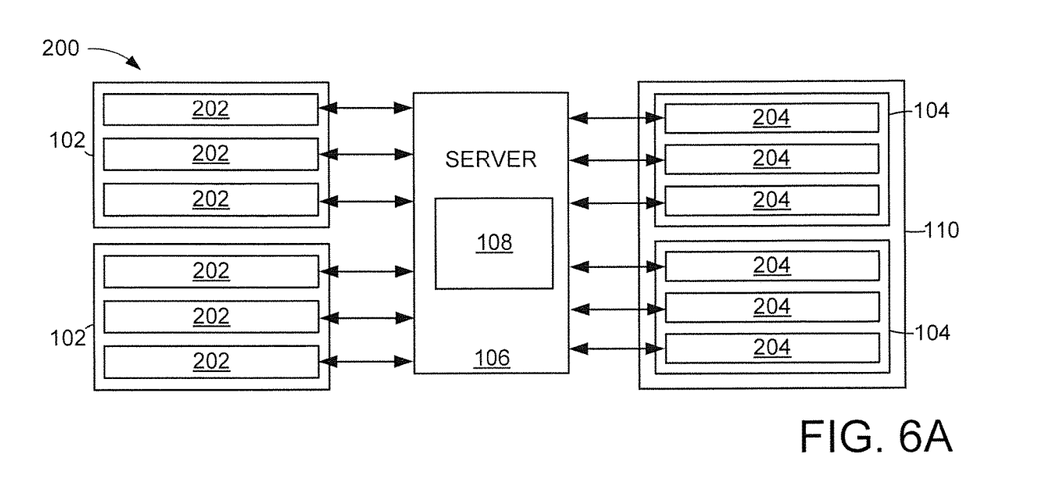
FIGS. 6A & 6B respectively represent portions of an example data network configured in accordance with some embodiments FIG. 7 conveys an example virtualization routine that may be carried out with the assorted embodiments of FIGS. 1-6B.
Figure 6B:
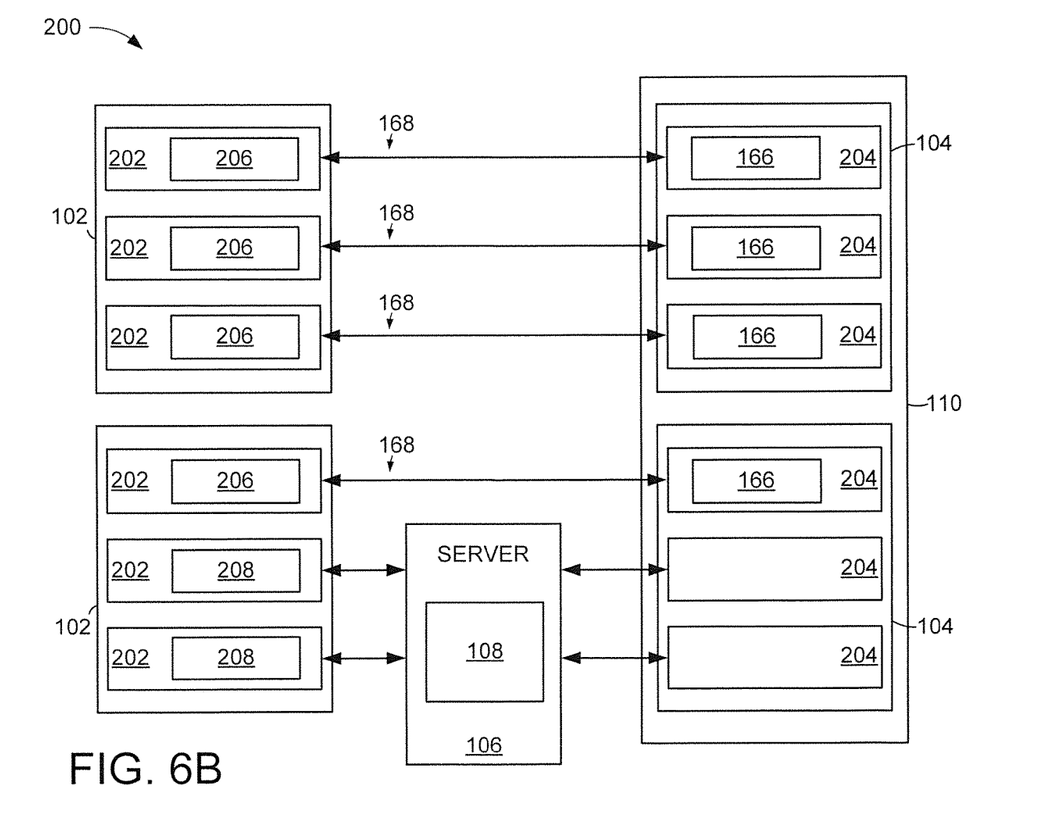

The in-drive mutex 180 allows for a data storage device to handle data network requests, commands, and activities efficiently despite multiple different hosts 102 and at least one server 106 communicating with, and concurrently utilizing, the device controller. The in-drive mutex 180 can be particularly effective when a host 102 is divided into multiple logical volumes that separately deploy container-based virtualization. FIGS. 6A and 6B respectively illustrate block representations of portions of an example distributed data network 200 where a remote host 102 employs container-based virtualization in multiple different logical volumes 202 in accordance with some embodiments.

In FIG. 6A, the data network 200 is shown as initially configured and prior to the server 106 assigning data storage devices 104 to various remote hosts 102. It is contemplated that at least one host 102, and/or a data storage device 104, is divided into separate logical volumes 202 that are designated a range of logical block addresses (LBA). The presence of logical volumes 202 allows a single host 102, or data storage device 104, to concurrently handle data in different ways. For example, different logical volumes 202 can have different security, provisioning, priority, or initialization policies, which provides the ability to customize handling of data, firmware, software, and applications in the respective logical volumes 202.

It is noted that a logical volume 202 may span multiple data storage devices 104 or hosts 102, but such configuration is not required or limiting. The use of a logical volume 202, as opposed to a partition or separate host/device, allows for efficient alteration without having to reboot portions of the data network 200. For instance, a server 106 can assign a logical volume 202 and subsequently change the size, assigned data storage device 104, and/or operating policies of the logical volume 202 to accommodate detected, or predicted, network activity as well as optimize computing performance, such as software application initialization, data generation, and data retrieval.

FIG. 6B conveys a non-limiting manner of how a network server 106 can configure the data network 200 to optimize the use of logical volumes 202. The server 106 may begin with the network configuration shown in FIG. 6A with multiple remote hosts 102 connected to multiple data storage devices 104 via the server 106. The server 106, in accordance with some embodiments, can assign the generation of logical volumes 202 in a host 102 and/or data storage device 104 in response to detected, or predicted, network activity. A logical volume 202 may be created by the server 106 to allow container-based virtualization in the host and may correspond with a data storage logical volume 204 of one or more data storage devices 104.

The logical volumes 202/204 allows virtualization to be carried out as directed by the sever 106 or by a designated data storage device 104. As shown in FIG. 6B, the server 106 can direct a data storage device 104 to conduct a first container-based virtualization 206, such as the deploying, loading, and executing of an app container, in a host 102 while the server 106 conducts a second container-based virtualization 208 on a different host 102. It is contemplated that the server 106 may conduct a different type of virtualization than the data storage device 104, such as a virtual machine.

At any time, the server 106 or data storage device 104 can change the logical volumes 202/204, designated administer of the virtualizations 206/208, and/or type of virtualization to adapt to changing network hardware, software, and/or host activity. As a non-limiting example, the second virtualization 208 can initially correspond with a designated host logical volume 202 and device logical volume 204 prior to an actual, or predicted, event that triggers the server 106 to change the size of a logical volume 202/204, location of the device logical volume 204, or designate a data storage device 104 to conduct future virtualization 208 activities.

With the ability to customize the virtualizations 206/208 and logical volumes 202/204 at will, the network 200 can intelligently adapt to changing hardware and virtualization activity. The capability to designate a data storage device 104 to administer virtualizations in one or more hosts 102 and/or logical volumes 202/204 allows the network 200 to provide faster virtualization initialization and software execution than if the centralized server 106 conducted virtualizations for large numbers of different hosts 102.

Figure 7:
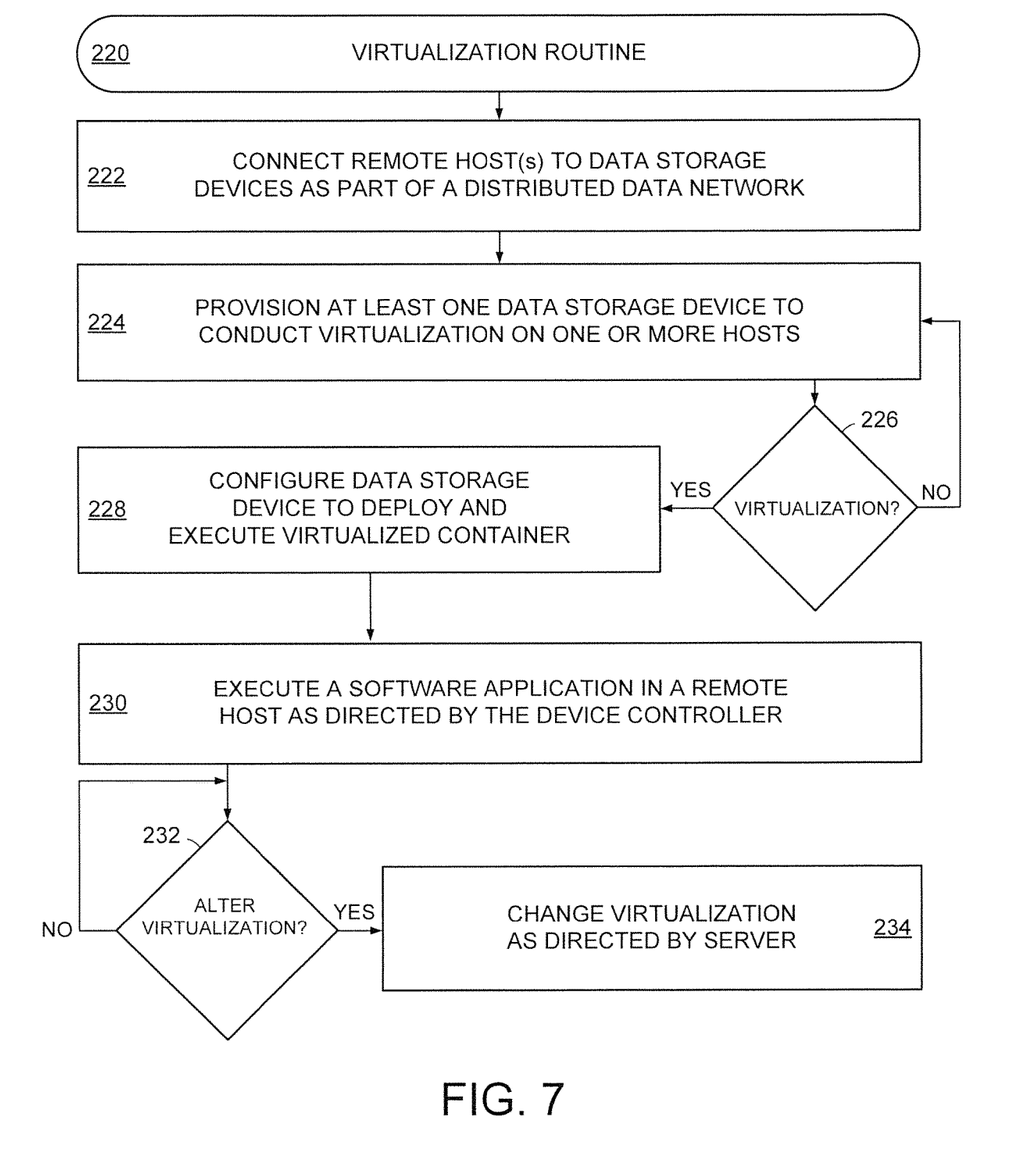

FIG. 7 is an example network virtualization routine 220 that can be carried out by the various embodiments of FIGS. 1-6B. The routine 220 has a distributed data network connected in step 222, which may comprise any number of data storage devices connected to any number of remote hosts via one or more network servers. Step 224 provisions at least one data storage device to conduct a virtualization on one or more remote hosts. Such provisioning can be assigning logical volumes, balancing network load between the server and data storage device, and establishing virtual infrastructure by a network server to be utilized later to deploy and execute virtualization on a host.

It is contemplated that a data network can function at step 224 for any amount of time to service data storage requests to connected data storage devices and deploy virtual machine virtualizations with the network server(s). The provisioning of step 224 allows decision 226 to evaluate if a container-based virtualization is called for based on network activity. If so, step 228 proceeds to configure a data storage device to deploy and execute a container-based virtualization where an operating system is loaded on the designated data storage device and deployed for use by a host after loading operating components in the host as directed by the device controller.

In the event a container-based virtualization is not triggered, the routine 220 can return to step 224 where non-virtualization network activities are carried out by one or more server controllers. Once a container-based virtualization is established and a data storage device is administering a container on at least one logical volume of a remote host, decision 226 may continue to add container-based virtualizations through step 228 to assign various hosts to selected data storage devices for virtualization administration. A container-based virtualization is utilized in step 230 to execute an application in the host, which involves both the host controller and the assigned device controller.

The execution of step 230 can occur concurrently, or sequentially, with decision 232 that evaluates if network activity detected, or predicted, by the sever dictates an alteration of the previously assigned container-based virtualization(s). Such network activity may involve the addition of new data storage devices, availability of different data storage device capabilities, change in the number of remote hosts, or change in the computing load of a host. Any change to virtualizations, assigned logical volumes, and/or assigned data storage devices are carried out in step 234 while no change returns routine 220 to decision 232 for continuous, or sporadic evaluation of network activity and virtualization configuration.

Through the cyclic operation of routine 220, data network performance can be continually optimized despite a variety of virtualizations being administered by data storage devices. The use of the in-drive mutex in combination with virtualization control being given to a data storage device allows a network server to efficiently detect, predict, and adapt to changing network hardware, software, and usage activity to maintain fast software application execution and container virtualization initiation. By utilizing the device controller to conduct container-based virtualization for at least one host, the sever will have the bandwidth and time to process current network performance, predict performance degradation due to changing network conditions, and alter the virtualization, assigned data storage device, and/or assigned logical volume to accommodate the changing network conditions.

What is claimed is:

1. A method comprising:
connecting a first data storage device and a second data storage device to a first remote host and a second remote host via a server;
assigning the first data storage device to establish a first virtualization with a first device controller of the first data storage device, the first virtualization deploying, loading, and executing an app container for a first logical volume of the first remote host;
executing an operating system in the first data storage device with the first device controller of the first data storage device;
loading at least one operating component of the first virtualization in the first remote host as directed by the first device controller; and
performing a first software application in the first remote host as part of the first virtualization.

2. The method of claim 1, wherein each data storage device comprises a device controller.

3. The method of claim 1, wherein the server comprises a server controller.

4. The method of claim 1, wherein the first and second data storage devices are each housed in a first enclosure and a third data storage device and a fourth data storage device of the plurality of data storage devices are each housed in a second enclosure.

5. The method of claim 4, wherein the first and second enclosures are housed in different racks positioned in different cities.

6. The method of claim 1, wherein the first data storage device has a peripheral component interconnect express (PCIe) bus employing a non-volatile memory express (NVMe) protocol.

7. The method of claim 1, wherein the server assigns the second data storage device to administer a second virtualization to the second remote host, the first and second virtualizations being different.

8. The method of claim 7, wherein the first and second virtualizations are administered concurrently.

9. The method of claim 1, wherein the first device controller of the first data storage device operates in conjunction with a processor of the first remote host to perform the first software application.

10. The method of claim 1, wherein the server assigns the first data storage device to administer a second virtualization for a second logical volume of the first remote host concurrently with the first virtualization.

11. The method of claim 1, wherein the server administers a second virtualization to the second remote host.

12. The method of claim 11, wherein the first and second virtualizations are respectively administered concurrently.

13. The method of claim 1, wherein the first data storage device services a data access request from the server while administering the first virtualization.

14. The method of claim 1, wherein the server directs the first device controller to alter the first virtualization in response to predicted network activity.

15. A method comprising:
- connecting a first data storage device and a second data storage device to a first remote host and a second remote host via a server;
- assigning the first data storage device to establish a first virtualization with a first device controller of the first data storage device, the first virtualization deploying, loading, and executing an app container for a first logical volume of the first remote host;
- executing an operating system in the first data storage device with the first device controller of the first data storage device;
- loading at least one operating component of the first virtualization in the first remote host as directed by the first device controller;
- performing a software application in the first remote host as part of the first virtualization; and
- activating an in-drive mutex in the first data storage device as directed by the first device controller.

16. The method of claim 15, wherein the in-drive mutex maintains a first data access request and a second data access request in different states to prevent resource contention.

17. The method of claim 15, wherein the in-drive mutex modifies access control for at least one logical volume of the first data storage device.

18. The method of claim 15, wherein the in-drive mutex prevents request redundancy, conflict, and error between a first data access request and a second data access request.

19. The method of claim 15, wherein the in-drive mutex resolves conflicts between a first data access request from a first host and a second data access request from a second host.

* * * * *